United States Patent [19]

Wong

[11] 4,069,119

[45] Jan. 17, 1978

[54] COPPER RECOVERY BY LEACHING AND ION EXCHANGE

[75] Inventor: Soon Y. Wong, Ponca City, Okla.

[73] Assignee: Continental Oil Company, Ponca City, Okla.

[21] Appl. No.: 773,088

[22] Filed: Feb. 28, 1977

Related U.S. Application Data

[63] Continuation-in-part of Ser. No. 686,441, May 14, 1976, Pat. No. 4,039,405.

[51] Int. Cl.² .................. C25C 1/12; C22B 15/00
[52] U.S. Cl. .................. 204/106; 75/101 R; 75/101 BE; 75/117; 423/24; 423/27
[58] Field of Search .............. 423/24, 27, 658, 5; 75/101 BE, 101 R, 117; 204/106, 107, 108

[56] References Cited

U.S. PATENT DOCUMENTS

| 3,853,618 | 12/1974 | Smith | 423/24 |
| 3,998,924 | 12/1976 | Jones et al. | 423/24 |
| 4,013,754 | 3/1977 | Stauter et al. | 423/27 |
| 4,017,309 | 4/1977 | Johnson | 423/27 |

OTHER PUBLICATIONS

Naden et al. "The Use of Continuous Ion Exchange in Copper Recovery Problems" J. Appl. Chem. Biotechnol. 1974 24 687–700.

Hughes et al. "Use of Solvent–Impregnated Polymer to Extract Copper from Certain Acid Solutions", *Inst. Mining & Metallurgy Transactions* vol. 85, sect. C 9/76.

*Primary Examiner*—O. R. Vertiz
*Assistant Examiner*—Brian E. Hearn
*Attorney, Agent, or Firm*—Cortlan R. Schupbach, Jr.

[57] ABSTRACT

This invention relates to a process whereby recovery of copper from copper ores using leaching and ion exchange techniques can be increased. The process generally comprises leaching to obtain a pregnant leach liquor, washing ore residues with an extra quantity of water to obtain extra dissolved copper values, recovering said copper values, combining the extra wash water with the pregnant leach liquor, extracting copper values from the total leach liquor by ion exchange techniques to yield a raffinate which still contains some copper values, and cycling part of the raffinate through a low pH ion exchange circuit to lower the copper values remaining in the raffinate to about 0.01 to 0.02 grams per liter or less before disposal.

10 Claims, 4 Drawing Figures

COPPER RECOVERY BY LEACHING AND ION EXCHANGE

This application is a divisional continuation in part of Ser. No. 686,441, filed May 14, 1976, now U.S. Pat. No. 4,039,405.

This invention relates to a process whereby serious technical and economic problems commonly found in the leaching of copper ores and subsequent processing of the copper-containing solutions to recover copper are eliminated. More specifically, the invention provides an improved process for washing the leach vats with extra wash water, recovering copper values therefrom, combining the excess wash water with the pregnant leach liquor obtained from the leach vats, ion exchanging the combined copper containing liquor, and cycling part of the post-ion exchange raffinate through a secondary ion exchange circuit which operates efficiently at a low pH to lower the copper values to about 0.1 gram per liter or less.

Recovery of metal values from metal bearing ores using leaching processes have been used for many years. Generally, the process followed has been simply leaching the crushed ore with a suitable material for leaching, such as an acid, in vessels for periods of time sufficient to extract the metal values from the ore. In copper leaching, for example, the time ore remains in a vat can range very widely. While undergoing the different leach operations, a series of vessels are used such that once underway, a process can continue without interruption while undergoing the steps of loading fresh ore, leaching the ore, recirculating solutions, making pregnant liquors, washing the ore residues, draining wash waters, and unloading the spent ore in a completely cyclic manner. Preferably the pregnant leach liquor produced in the vat system is removed about once a day, and fresh ore is loaded into an empty vat once each day.

The cycle time for each vat is determined by the total time required to carry out the necessary operations of the leaching process, including the time needed for repairing, draining, unloading, washing, advancing the leaching solutions from one vat to another, recirculating the solutions within a vat and for producing the pregnant liquor. As the leaching cycle of a vat progresses from the day ore is first placed in the vat to the day that the ore is washed prior to removal, ore residue in the vat become progressively lower in metal values. Typically the oldest vat (that which has been undergoing leach for the longest time), when complete, is washed one or more times, the wash water being sent (advanced) to the next oldest vat. In turn, the leaching solution from this vat is simultaneously advanced from this vat to the next oldest vat. Such advances are continued until the leaching solution enters the vat containing freshly charged ore. The solution removed from this vat is the pregnant leach liquor. The pregnant leach liquor is then sent to an ion exchange circuit containing one or more copper adsorption stages wherein the copper values are recovered, and the recycle stream, still containing some copper values, and called a raffinate stream, is recycled, all or in part, to the vat for additional wash effect. This stream becomes a part of the solution that advances through the vat system.

This system is known to be inefficient with respect to economic value and to recovering all possible copper values from the ores used. Other leaching systems such as agitation leach, heap leaching, and dump leaching are also subject to a degree to the same economic and technical problems.

Heap and dump leaching do not use wash waters but in some preferred modes of operation these technical problems can be lessened by the essential features of the process of this invention.

For some copper metallurgical plants, the crushed ores for leaching in vats contain so many fine particles that is is preferable to separate the fine material from the larger ore particles by ore washing methods. The larger particles are sent to vats for acid leaching while the recovered fine particles are leached separately, preferably in agitation leach processes. Pregnant solutions obtained by separate agitation leaching of such fine ore particles are generally lower in copper values as compared to vat pregnant liquors from vat leaching. Also, extensive facilities for washing and recovering are needed to maximize recovery of the dissolved copper and to produce a final pregnant liquor solution essentially free of suspended solids. The later requirement must be vigorously met if, for example, solvent extraction processes are used to recover the copper values from the feed solution as produced in combination with other copper containing liquors. Ion exchange processes, in contrast, are well suited for handling feeds containing some suspended solids such as those suggested by Naden and Evans, *Journal of Applied Chemical Bio-Technology*, 1974 Volume 24, pages 687–700.

Pregnant liquors produced by separate leaching of recovered ore fines can be combined with, for example, pregnant liquors from vat leaching and other process streams to give a feed to the process of this invention.

The use of ion exchange systems would be advantageous over solvent extraction systems in these cases where process streams contain fine solid particles which are difficult to remove. For solvent extraction systems, the suspended solids must be reduced to very low levels such as about 5 to 10 parts per million or less in order to minimize the formation of excessive and troublesome quantities of sludges. These sludges interfere with good operation of the solvent extraction systems. Sludge removal is necessary. Extra equipment and facilities are needed to recover valuable solvent extraction agents from these sludges.

Depending on the exact ion exchange systems used, feeds containing higher quantities of fines solid material can be employed without operating difficulties. Examples of such systems are fluidized ion exchange beds, moving bed systems, and resin in pulp systems.

In addition to pregnant liquors thus obtained by the leaching of fine particle ores, other pregnant liquors may also have the problem of excessive quantities of suspended solids or of small solid particles formed as a consequence of the overall acid leaching reactions. For example, one Arizona oxide copper ore, upon conventional vat leaching with aqueous sulfuric acid, unavoidably yields a pregnant liquor containing large quantities of "dissolved" silica. It has been found that upon standing for relatively short periods of time (24–48 hours) collodial silica particles are formed which are not removable by filtration. Expensive flocculating agents such as polyethyleneoxide polymers such as those sold under the trade name "POLYOX" by Union Carbide Corporation are needed to agglomerate the collodial silica particles for separation which leads to added processing cost. Ion exchange processing would be advantageous in this instance since the process can accept such a feed without undue technical difficulty and without the need for expensive chemical treatment to remove such troublesome particulate matter.

For the purposes of the instant invention, generalized copper ore vat leaching processes have been utilized. A cycle time of about 10 days has been selected. The vat system contains about 10 vats. During operation on any given day, for example, the No. 1 vat will be loaded with fresh ore while No. 2 vat will be unloading spent ore, No. 3 vat will be undergoing final water wash, No. 4 vat will be undergoing leaching, Nos. 5 through 9 will also be undergoing leaching, and No. 10 will produce the pregnant leach liquor. On the previous day, No. 10 vat was loaded with fresh ore. The pregnant leach liquor is always produced from the vat containing freshly charged ore.

In the heretofore preferred manner of operation, final vat wash waters are temporarily sent to storage for use as the initial wash of the following day. Simultaneously the leaching liquors are sequentially passed or advanced through Vats 4 through 10. It may be preferred to recirculate the leaching liquors within each vat during a part of the day's operations. Acid may be added to any vat or vats in the leaching portion of the cycle during the solution advance or recirculation period.

Wash waters in the leaching system must be controlled to the proper balance. The water leaving the total vat system is made up of water leaving with the residual ore being removed from vats, mechanical and evaporation losses, and that contained in the pregnant liquor. Water entering the system is made up of wash water, recycled water such as that recycled as raffinate, usually containing some copper and acid values, water contained in the freshly charged ore, and water added to agglomerate fines in the freshly charged ore. Other water losses or additions can be accounted for if these occur.

Water material balances necessary in prior art processes do not allow efficient washing of the residual ore residues in order to wash out and recover dissolved copper values remaining in the ore bed. The amount of wash water is limited, as can be seen in the water material balance given before.

The pregnant liquor so produced is sent to an ion exchange circuit having one or more adsorption stages. Herein most of the copper values are recovered, and a raffinate stream is produced. Said raffinate stream still contains a large quantity of copper, usually ranging from less than 1 gram per liter to about 0.2 to about 0.8 grams per liter, depending upon the design and operation of the ion exchange adsorption system, the ion exchange agent used, and the acidity of the leach solution, and other technical factors. Some of the copper-containing raffinate is recycled to the vat leaching system. However, some raffinate must be purged from the system to control the buildup of deleterious impurities in the pregnant leach liquor, such as the salts of sodium, calcium, silica, iron, aluminum, and others. All copper values in this portion of the raffinate are normally lost. These values are not recovered by current methods. All copper values in this portion of the raffinate are lost if extra steps or procedures are not used to recover them.

It can be clearly seen that the prior art process leaving copper in the unrecovered or purged raffinate leads to serious economic loss. These values are not now recovered by current methods that are technically desirable or economically attractive. There are several possible means for recovering such copper values, such as by cementation with metallic iron, or by chemically precipitating the copper values, such as by reaction with hydrogen sulfide or sulfide-containing chemicals, such as sodium sulfide. These are costly procedures which are undesirable.

Thus, it is well established that it is highly desirable and necessary to obtain maximum recovery of dissolved copper values. Extra wash water as defined herein refers to the quantity of water over and above that required by the system to maintain the required and normal water material balance. Thus, extra wash water cannot be used in and become a part of the leaching system because of the material balance restrictions. Heretofore extra wash water if used has been removed from the vat system and sent to an iron cementation plant for copper value recovery from the wash water. This, however, is undesirable, as set forth above, since the process is expensive and produces only an impure product that must be further processed before use.

All leaching systems for copper bearing ores are subject to one or a combination of the restrictions described herein. It is clear that as copper ores become less available and contain less copper that it would be highly desirable to develop a system which allows a higher recovery of copper while maintaining or reducing the cost of installation and operation.

It would be of great benefit to use a system which would allow effective washing of leached ore residues, improve processing and handling of the leached ore residue wash water without requiring extra and undesirable facilities, and maintaining a single feed to the ion exchange copper recovery facilities, while purging the required amount of an aqueous stream to prevent the buildup of undesirable impurities in the system.

As stated above, leaching processes have long been known in the art. Representative examples of such processes can be found in U.S. Pat. Nos. 3,455,680; 3,761,249; 2,993,782; 3,399,055; 3,224,873; 3,104,971; 3,440,036; and 3,878,286. These patents all relate to various methods for recovering copper from solution; however, none of the inventions have shown or provided a method for solving many of the economic and technical problems inherent in leaching nor for recovering the greatest amount of copper from solution. It would be of great benefit to be able to extract or recover more copper from the ore residues, reduce costs in processing, and recover more copper as metal.

It is therefore an object of the present invention to provide an improved process for obtaining copper from copper-bearing ores using leach processing and ion exchange processing. Other objects will become apparent to those skilled in this art as the description proceeds.

It has now been discovered, according to the instant invention, that the objects of the invention can be obtained by utilizing an improved process for the recovery of copper values from copper bearing ores comprising (a) leaching the ore with mineral acid in the presence of water to produce a pregnant liquor stream containing dissolved metal values, and washing the leached ore residue with an internal recycle stream from step (c) in addition to other wash waters, (b) passing additional extra water through the leach vessel containing spent ore residues, said ore being disposed from the system and said water being removed from the vat leaching system and subsequently combined with the pregnant liquor stream from step (a) to form a resultant stream which is then passed through (c) first a solid ion exchange system containing at least one adsorption stage containing a solid ion exchange adsorption agent for adsorption of said metal values, said first ion exchange system producing a loaded solid ion exchange agent containing the metal values and an aqueous raffinate stream containing metal values not extracted from the resultant stream of step (b), and separating said raffinate stream into a first internal stream of aqueous raffinate and a second internal stream of aqueous raffinate, (d) passing the first internal raffinate stream back to step (a) of the system, and (e) passing the second internal raffinate stream to a second ion exchange system having at least one copper adsorption stage containing a second ion exchange agent where the metal values are adsorbed by the ion exchange agent at a low pH said solid ion exchange system producing a loaded solid ion exchange agent and a disposal stream, while (f) the copper values in the loaded solid ion exchange agent from step (e) is eluted or removed from the loaded solid ion exchange agent in a system containing at least one eluting stage in the presence of sufficient eluting acid containing aqueous eluting agent, resulting in a regenerated ion exchange agent from which the copper values have been removed and an eluting acid stream containing the recovered copper values, (g) reusing or recycling the regenerated ion exchange agent from step (f) to the copper adsorption stage of step (e), while (h) the eluate acid stream of step (f) containing recovered metal values and excess acid is passed to the process described in step (a), and (i) the loaded ion exchange agent produced in step (c) is subjected to at least one regeneration stage wherein a regenerated ion exchange agent and a pregnant electrolyte stream as eluate containing the copper values is produced, subsequently (j) reusing the regenerated ion exchange agent on the resultant stream for copper adsorption described in step (c), while (k) passing the eluate pregnant electrolyte to a metal recovery process from which exits a spent electrolyte stream which is recycled as eluting solution to step (i) after addition of any acid needed as a eluting agent, and (1) recovering the metal values as metal from step (k).

It will be apparent that while the above process is directed to vat leach processes, it can also be used in combination with leaching of separated and recovered fine ore particles agitation leaching, dump leaching, heap leaching, etc. While the process described is directed toward copper values, other metal values can also be obtained using the process of the instant invention.

The economical and efficient processing of the combined aqueous solutions enables washing of the spent ore in the leach vats with larger volume operations. While in the past excess wash waters containing copper were sent to cementation plants for metal recovery, the process was excessively expensive, yielding an impure product which required additional refining before it can be marketed. Under the process of the instant invention, effective washing is obtained which greatly reduces the amount of dissolved copper otherwise lost in the ore tailings. An effective and economical way of handling the extra wash water is provided.

The preferred manner of operating the first ion exchange circuit on a low copper concentration feed allows operation of the second ion exchange circuit to recover almost all copper in the feed.

Recycle of the loaded eluate acid from the second ion exchange system containing the recovered copper to the leaching circuit as part of the acid feed of said circuit is a significant and important feature of the instant invention. The use of an ion exchange agent which is effective at low pH usually results in a loaded eluate acid so high in acid concentration that the copper normally cannot be practically recovered using methods such as electrowinning. Other costly methods of copper recovery would therefore have to be utilized, for example, such as crystalizing the recovered copper values as copper sulfate. These problems are avoided in the instant invention.

The invention likewise allows discard of solutions containing undesirable quantities of inorganic salts. Without this discard, such undesirable inorganic salts would soon build up to unacceptable levels in the leaching circuit. The reduction of the copper content in the final purge solution is to levels sufficiently low in metal values to avoid serious economic loss, said low levels being easily obtainable without utilizing costly and undesirable processes such as cementation.

The process of this invention is not limited to any particular scheme for conducting the ion exchange step. For example, multiple columns of ion exchange agents can be employed in which the feed passes through said columns in series. Fully saturated columns are removed from the adsorptive circuit for regeneration with eluting agents followed by copper recovery. Freshly regenerated columns are inserted as the last adsorption unit at the end of the series. Other units are then undergoing adsorption or regeneration. In this scheme ion exchange columns cyclicly undergo adsorptive and regeneration steps.

Fluidized bed type processing may be used as well as other types of moving beds. Loaded resins are sequentially transported to separate regeneration units where the loaded resins are regenerated by eluting solutions to give a metal rich eluate and a regenerated ion exchange agent for reuse in adsorption units.

The resin in pulp processes are particularly applicable wherein the feed solutions contain a significant amount of fine particulate matter. Loaded ion exchange agents are separated and regenerated in separate facilities.

There are several advantages in the use of ion exchange systems for recovery of copper values from copper-containing feed solutions. Feeds containing relatively large quantities of suspended solid particulate matter such as fine ore particles or collodial particles can be processed without difficulty. The cost of completely separating such particulate matter is eliminated. In prior art solvent extractions systems suspended solid particles above limiting values of about 5 to 10 parts per million lead to excessive formation of sludge materials which interfere with the operation. Valuable extraction agents are lost if not recovered in separate facilities.

Solvent losses in solvent extraction systems can be a significant cost. The use of solid ion exchange resins would essentially eliminate or at least greatly reduce such losses.

In solvent extraction systems the volume of the process is large and the rate of phase separation of the solvent and aqueous feed solutions is relatively slow. Large settlers are needed to affect good separation. This results in high inventories of expensive and costly solvent extraction reagents. The use of an ion exchange system would eliminate the need for carrying such a costly inventory.

Also some savings and operating power costs can be realized since system agitation would not be needed in the ion exchange process.

Figure 1:
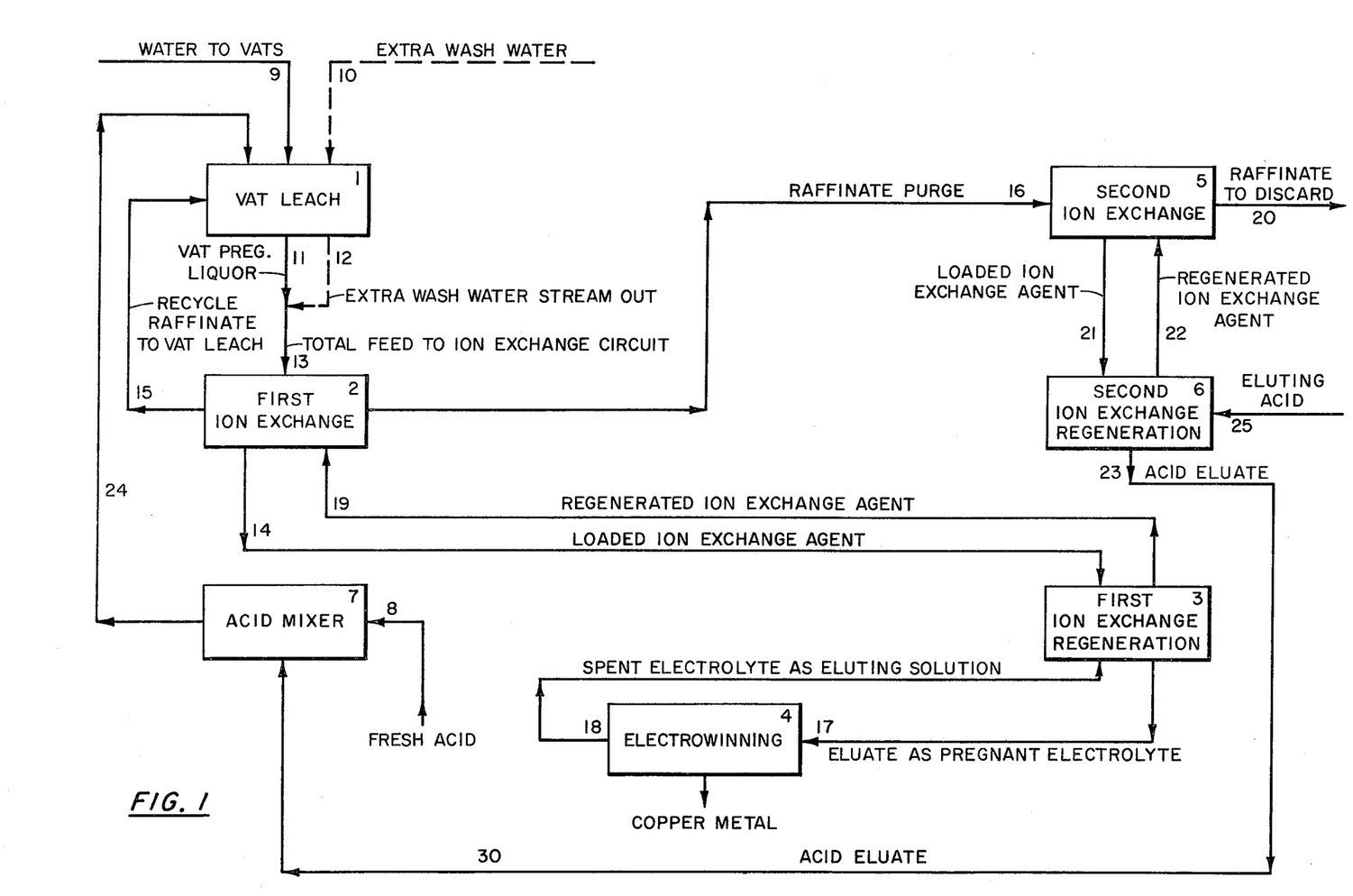
FIG. 1 is a schematic describing the overall general process.

FIG. 1 is a schematic drawing showing the process of the instant invention. In the figure, a vat leach 1 process whereby at least one vessel is equipped to allow extraction of metal values from metal-bearing ores passes as pregnant liquor to the primary ion exchange system 2 wherein at least one ion exchange adsorption stage is utilized to obtain the raffinate stream and the loaded ion exchange agent. An ion exchange regeneration stage 3 produces a pregnant electrolyte as eluate which is passed on to an electrowinning stage 4 which produces the solid metal and a spent electrolyte solution as eluting solution. Make-up acid may be added if needed to get an eluting solution of the required acidity. The total acid content must not be so high as to cause problems in the electrowinning step, however. The secondary low pH ion exchange system 5 accepts the aqueous raffinate second internal stream, then produces a loaded ion exchange agent 21 and a discard stream 20. An ion exchange regeneration stage 6 produces an eluate acid stream 30 which passes to an acid mixer 7 wherein fresh acid is added as make-up 8 before being passed to the vat leaching 1. Fresh water as wash water is added through line 9 in quantities to satisfy the water balance of the process while the excess fresh water of the instant invention is added as stream line 10. This water does not advance into the leaching system but is removed as stream 12. The vat pregnant liquor 11 is combined with the extra wash water 12. The two streams 11 and 12 are combined to form a composite feed stream 13 which is passed to the first ion exchange system 2. There a loaded ion exchange agent 14 is produced as well as a first internal raffinate stream 15 and a second internal raffinate stream 16. The loaded ion exchange agent 14 is regenerated in the first ion exchange regeneration system 3 which produces an eluate as pregnant electrolyte 17. After passing through conventional electrowinning 4 the spent electrolyte as eluting solution with or without added acid is passed again through the ion exchange regeneration system 3 which produces a regenerated ion exchange agent for reuse 19 in the ion exchange system 2 for subsequent copper value adsorption. The low pH second ion exchange system receives aqueous raffinate 16 and produces a discard aqueous stream 20 and a loaded ion exchange agent 21. The loaded ion exchange agent is regenerated in regenerating system 6 producing a regenerated ion exchange agent 22 which is reused in the low pH ion exchange system 5 and a loaded eluate acid 23 or 30 which is passed through an acid mixer 7 where fresh acid is added 8 to form an incoming acid stream 24 which is passed to the vat leach 1. Fresh eluting acid containing 25 water is added to ion exchange regeneration system 6. The first internal raffinate stream 15 from ion exchange system 2 is recycled back to the vat leaching system 1 and is a part of the water balance of the vat system.

It will be apparent to those skilled in this art that, under the broad guideline set forth above that yet other variations can be made which will provide benefits, dependent upon the process desired. For example, when a vat leach is used, the loaded acid eluate stream of step (f) can be passed through an acid mixing stage where sufficient fresh acid is added to yield a solution containing the total desired amount of acid for the process of step (a).

Figure 2:
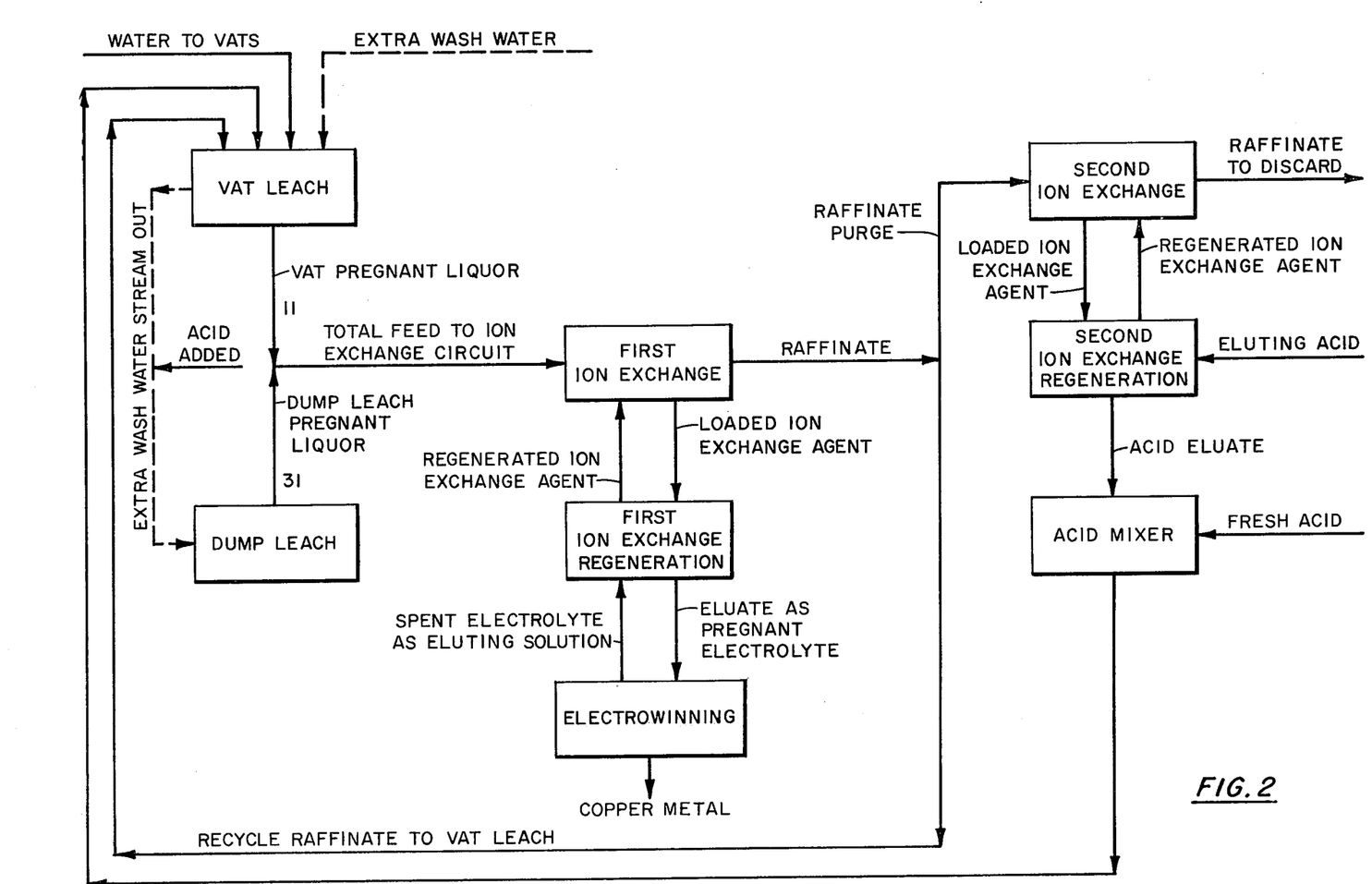
FIG. 2 is an alternate process of wash water.

Yet another process would utilize the wash water of step (b) by removing it from the vat leach system, adding acid and utilizing the resulting solution as a leaching agent in a dump or heap leach producing a second pregnant liquor stream 31 which may be combined with the pregnant liquor stream 11 from the vat leach and the combined stream can be processed in the ion exchange system 2. Such a variation is shown in FIG. 2, wherein the basic process is set forth with the variations included.

Figure 3:
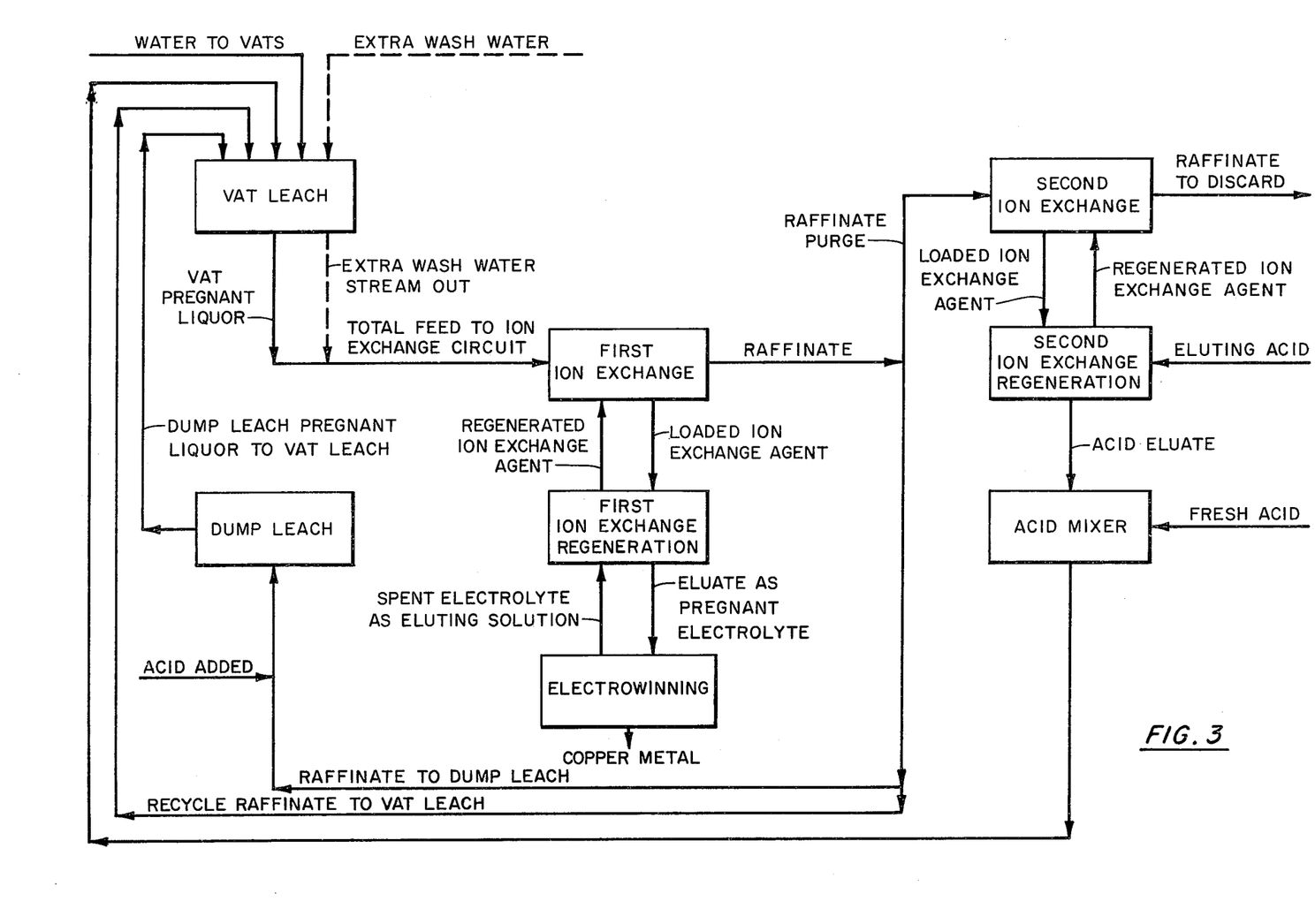
FIGS. 3 and 4 show uses for the internal recycle streams.

It will likewise be apparent that the internal raffinate recycle streams described above can be utilized in differing manners. For example, the first internal stream or raffinate or step (c) can be further divided to form a third and fourth recycle stream, the third recycle stream passing to step (a) of the process and the fourth recycle stream being combined with acid to form a leach agent for a dump or heap leach producing a pregnant leach liquor. The process can be further modified by using the pregnant leach liquor from the dump leach as part of the vat leaching solution, combining the pregnant leach liquor of step (a) and the wash waters of step (b) to form the feed to the ion exchange system stage of step (c). Such a process is shown in FIG. 3.

Figure 4:
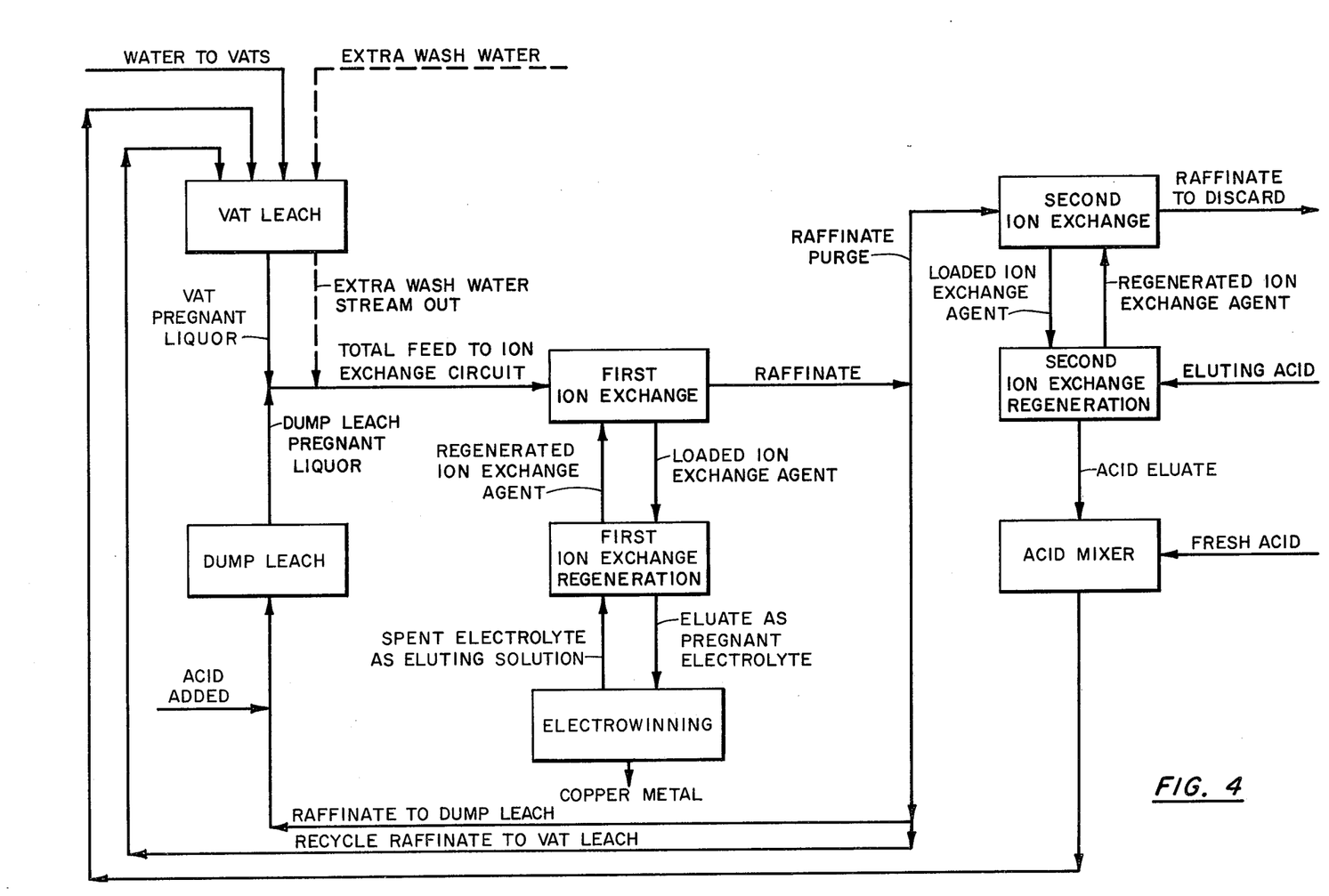

Also, for example, the pregnant leach liquor from the dump leach can be combined with the pregnant leach liquor from the vats and the extra wash water to form a combined feed stream to the first ion exchange system as shown in FIG. 4. All raffinate purged from the first ion exchange system goes into the second ion exchange system in all cases. The second ion exchange system raffinate is purged to disposal to prevent buildup of undesirable salts as set forth above.

In these examples, it will also be apparent to those skilled in this art that the pregnant liquors or copper containing streams that are produced by separate leaching of fine ore fractions recovered from crushed ore feeds for vat leaching can be appropriately combined with various streams in many ways for efficient and maximized recovery of copper values in the final feed stream by the processes of this invention. For example if the fine ore fraction is sufficiently high in copper values, the pregnant solution obtained by a separate leaching could easily be combined with the final leach solution for the vat leaching as the ultimate feed to the ion exchange portion of the process.

In these examples, the raffinate purged from the leach system or combination of leach systems is sent to the second ion exchange adsorption and regeneration system for recovery of metal values. The resultant raffinate, containing only very low quantities of metal values, is discarded.

The amount of raffinate from the first ion exchange system that must be removed and processed in the second ion exchange system is determined by the amount of solution that is purged from the leach system to control salt buildup. The quantities of first ion exchange raffinate that is sent to, for example a dump leach operation, will depend upon the size of the dump leach operation and the preferred rate of applying leaching solution to the dump. The remainder of the raffinate is then recycled directly to the vats.

It will be apparent to one skilled and knowledgeable in this art that the above modifications set forth and others like them can be made within the basic process scheme once known. The instant invention provides a unique combination of extra wash water and ion exchange circuits to wash the spent ore residues to place maximum metal values in solution while utilizing a second ion exchange circuit operable under low pH conditions to maximize ultimate metal recovery from the solutions of the process. Clearly, the two are useful only in combination, since recovering metal values from ores as solution is of no benefit, if the metal values cannot be recovered from solution. Present techniques utilize only a primary ion exchange circuit, the remaining metal values being lost as purge or unrecoverable due to low pH solutions. As indicated before, metal values can be recovered but such prior art processes are undesirable and costly.

Having explained the invention in detail, a more concrete description is provided with reference to the examples below. It is emphasized that the examples given are intended to exemplify the instant invention and should not be construed to limit it. Example 1 is a comparative example showing the state of the art at the time of the invention. Example 2 is an example which shows the effect of extra wash water which is not advanced through the leaching vessels. Example 3 shows the effect of extra wash water and a second low pH extraction circuit.

EXAMPLE 1

A conventional vat leaching system containing a required number of vats per line and the required number of lines of vats to leach 30,000 tons of copper ore per day will be employed. In this example, two parallel lines of vats are preferred to handle the 30,000 tons of copper ore per day. Each line contains 10 vats. Each vat has a capacity of 15,000 tons of ore. The ore contains about 0.48 percent by weight total copper of which about 75 percent is dissolvable by the acid leaching solution in the preferred manner of operation. About 3,240,000 gallons per day of a pregnant liquor containing about 7 to 8 grams per liter of copper is produced by the vat system described. This pregnant liquor is sent to an ion exchange circuit wherein a loaded ion exchange agent is produced. The loaded ion exchange agent is regenerated in the ion exchange regeneration section where a regenerated ion exchange agent is produced and reused in the ion exchange adsorption step. A pregnant electrolyte as eluate obtained in the ion exchange regeneration is sent to electrowinning to recover the copper as metal.

The raffinate that is usually produced in a single section ion exchange system will contain some unadsorbed copper. The amount of unadsorbed and unrecovered copper in the raffinate for the single ion exchange system scheme will depend upon the concentration of copper in the feed solution, the pH or acidity of the solution, the ion exchange agent that is employed, and the ion exchange recovery process used such as series fixed bed, fluidized bed, moving bed, or resin in pulp. Selectivity of the ion exchange agent for copper over other metal ions and ionic composition of the feed solution are also important factors. Regeneration efficiencies and effective removal of co-adsorbed non-copper ions are important factors.

All of the raffinate so produced cannot be recycled to the vat leaching system since concentrations of undesirable and harmful inorganic salts will build up to levels that are intolerable in the leaching and ion exchange steps. In the instant example about 50 percent of the raffinate is recycled to the vat system and the remainder must be purged and disposed, although somewhat more or less raffinate can be recycled or purged. Thus, the purged raffinate amounts to about 1,620,000 gallons per day. The copper contained in this stream could in some cases amount to as much or more than 12,155 pounds per day. In other cases the contained copper could be less than this quantity. Such a loss, if not recovered, is excessively costly.

EXAMPLE 2

The same vat leaching system as described in Example 1 will be employed at a leaching rate of 30,000 tons per day of the same copper ore. Again about 3,240,000 gallons per day of a pregnant leach liquor is produced as a conclusion of the usual leaching and washing procedures. The vat containing the ore residues that are to be removed and discarded from the vats is washed further with an extra 3,420,000 gallons per day of water; however, more or less of this quantity of extra wash water cold be used. The extra wash water does not go or advance into the vat leaching system but is removed after the washing function and added to the pregnant leach liquor, thus maintaining the proper balance of water in the vat leach system. The combined total of 6,660,000 gallons per day is then sent as a feed to an ion exchange adsorption-regeneration circuit similar to that of Example 1.

In the ion exchange adsorption circuit, there is produced a loaded ion exchange agent and a raffinate stream containing unextracted copper values. Again, about 50 percent of the raffinate is discarded in order to control inorganic salt buildup. The remainder is recycled to the vats. In the instant example, 51.3 percent of the total raffinate fluid is purged. Thus about 3,420,000 gallons per day of raffinate per day is purged and about 3,240,000 gallons per day of raffinate is recycled to the vat leaching system.

The combining of the extra wash water used with the pregnant leach liquid from the vats results in a feed containing about 3.4 to 3.6 grams per liter of copper. This combined stream is the feed to the ion exchange adsorption circuit.

Because of the decreased concentration of copper in the combined feed to the adsorption circuit, the ion exchange adsorption section can be designed to yield a raffinate containing a much lower copper concentration then in the previous example.

With proper design of the ion exchange system, and selection of the ion exchange agent, the unadsorbed copper in the raffinate could amount to about 0.2 grams per liter as compared to the 0.9 grams per liter shown in the prior art Example 1.

The volume of the raffinate purge is 3,420,000 gallons per day with a copper content of 0.2 grams per liter. Thus the loss in copper per day amounts to 5,702 pounds. This may be compared to the 12,155 pound loss per day of Example 1. The use of the extra wash water and the method of handling described herein as a part of the invention is clearly illustrated to be a distinct improvement in the overall copper recovery.

EXAMPLE 3

Again, 30,000 tons of ore per day is treated in the same vat leach system described in Examples 1 and 2. The ore contained the same amount of copper as previously described. Pregnant leach liquor in the amount of 3,240,000 gallons per day will be produced. More extra wash water than was described in Example 2 will be used, the system being washed with 4,212,000 gallons per day. The extra wash water is used to wash the ore residues in the vat from which the residues are to be removed. The extra wash water does not advance into the vat leaching system but is removed from the system after use as wash. This wash water is combined with the 3,240,000 gallon per day pregnant leach liquor. The combined solution equals 7,452,000 gallons per day and will contain about 3.1 to 3.2 grams per liter of copper. This combined feed is sent to a first ion exchange circuit.

The raffinate from this first ion exchange system will contain about 0.4 grams per liter copper under the system and conditions selected. The copper concentration of the raffinate at this point in the process is preferably allowed to be somewhat larger than that of the raffinate described in Example 2. This tends to lower costs in the first ion exchange system without incurring a cost penalty in the second ion exchange system. Lower concentrations such as 0.3 grams per liter or less could be achieved, however.

Thus 3,240,000 gallons per day of the first ion exchange system raffinate is recycled directly to the vat leaching system. The remainder of the raffinate, amounting to about 4,212,000 gallons per day, is removed from the vat leaching system and is sent to a second ion exchange system. In this second ion exchange system, an ion exchange agent is employed which is effective for extracting copper values under conditions of a low pH (high level of acid).

Operating with this second ion exchange system, a loaded ion exchange agent is produced. This loaded ion exchange agent is regenerated in a regenerating section. Preferably the regenerating agent is an aqueous solution of a mineral acid, preferably sulfuric acid. Depending on the ion exchange agent used the regeneration acid solution may contain from 250 to 500 grams per liter of free sulfuric acid or more. If available, a solution containing some copper values plus this same range of acid can also be used as the regenerating agent, or eluting solution, if preferred. The regenerating acid removes the copper values from the loaded ion exchange agent. The regenerated ion exchange agent is reused in the adsorption section for extracting additional feed. The regenerating or eluting acid containing the recovered copper is preferably mixed with additional acid in quantities required by the vat leaching operations, and the solution is sent to the vat leaching system for leaching.

The raffinate of the ion exchange system is found to contain only 0.02 grams per liter of copper. Lower values such as 0.01 grams per liter or less can of course be obtained by proper design, operation and selection of the ion exchange circuit. Under the conditions of the instant example, it is seen that copper values in the discarded raffinate solution from the second ion exchange circuit amounts to only 703 pounds of copper per day. The reduction of potential copper losses from the extremely high levels of about 12,155 pounds per day of Example 1 to the improved daily potential loss of 5,702 pounds described in Example 2 to the very economically acceptable level of 703 pounds per day of Example 3 clearly shows the improved advantages of the process of the instant invention.

The ion exchange agents that are suitable for use in the process of this invention are many and of diverse types. Fairly extensive technical data are published for such agents that are commercially available or are well advanced in their technical development. Examples of such materials can be found in the *Journal of Applied Chemical Bio-Technology*, 1974, volume 24, pages 687–700, the *Journal of Applied Chemical Bio-Technology*, 1975, volume 25, pages 367–378, Extractive Metallurgy of Copper, chapter 52, edited by Yannopoulos, published by the Metallurgical Society of the AIME, 1976, an article found in the Trans. Inst. Mining and Metallurgy, pages C124–C132, entitled, "Use of Solvent-Impregnated Polymer to Extract Copper from Certain Acid Solutions", by Hughes and Purdey, September, 1976. Others can be found in *Trans. Inst. Mining and Metallurgy*, "Mineral Processing and Extractive Metallurgy", volume 83, March 1974, pages 30–38.

Ion exchange agents of the strong acid type adsorb copper as well as other ions such as calcium, magnesium, iron and aluminum without any specific selectivity for copper over pH ranges from 0 to 14. This type of agent would be useful only if the non-copper ions are not appreciably present in the feed or if their adsorptions do not lead to other difficulties. The presence of non-copper ions is usually a problem in most cases however. This type of agent could be employed as a low pH effective ion exchange agent of the second ion exchange circuit of the present invention if non-copper ions in the feed do not pose difficult problems such as precipitation as solids during their regeneration.

The effectiveness for acid leach liquors of base type agents is severely limited.

Strong chelating exchange agents are effective at the usual pH levels found for acid leach liquors. These are particularly useful in the process of the present invention. In this group are the commercailly available resins known by their trade names such as Dowex A-1, Lewatit TP-207, Zerolit S1006 (all amino diacetic acids), Duolite ES-63 (phosphonic acid), and Duolite CS-346 (amidoxime, all described in *Journal of Applied Chemical Biotechnology*, 1974) volume 24, pages 687–700, specifically 694.

Dow Chemical Company has recently released technical data on two agents which are useful in the instant invention. These are designated as XF-4195 and XF-4196 and more fully described in *Extractive Metallurgy of Copper*, Vol. II Chapter 52, page 1009, as presented at the February 1976 meeting of the Metallurgical Society of AIME. These agents are reportedly based on macroporous polystyrene divinylbenzene matrix on which weakly basic chelating functional groups have been attached.

Inorganic gels such as some zirconium phosphate gels are useful in recovering copper from dilute solutions.

Synthetic polymers of a porous nature can be used as substrates which can be impregnated with conventional solvent extraction agents such as the LIX family of copper extraction agents (hydroxy oximes) offered commercially by General Mills Corporation as described in *Transactions*, Vol. 254, (1973) by the AIME pages 319–323 and in co-pending United States application Ser. No. 686,441. These function as typical ion exchange bodies. In particular, LIX 64–N has been used to impregnate a polyurethane foam and the material employed as a typical ion exchange agent. Additional ion exchange bodies have been prepared from LIX 64–N and a variety of other polymeric resins including polyethylene, polystyrene, and other macroporous synthetic resins. Other porous resins of the XAD series produced by Rohm and Haas have been successfully impregnated with LIX 64–N to produce ion exchange agents. Suitable inorganic substitutes contain the desired porosity and adsorption properties could also be impregnated using the conventional solvent extraction agents.

Future developments of such impregnated ion exchange bodies could also comprise solvent extraction reagents other than the LIX family such as those manufactured by Shell (SME 529) substituted o-hydroxyaceto-phenone oxime, Acorga (P-5,000 series) substituted salicyladoximes, and Ashland Corporation (Kelex) proprietary β-alkenyl-8-hydroxyquinolines as described in *Journal of Chromatography*, Vol. 105 (1975) pages 151-156.

The extensive commercial interest in developing new solvent extraction agents and solid ion exchange agents for the recovery of copper values from leaching of copper ores is expected to result in additional and near future availability of ion exchange agents that are useful in the process of this invention.

In my co-pending U.S. patent application Ser. No. 686,441, specific mention was made of the particular usefulness of Lix-70 chlorinated hydroxybenzophenone oxime as the reagent of the second solvent extraction agent for treating the resultant low pH raffinate of the first solvent extraction section for recoverable contained copper. In this invention Lix-70 would also be a very satisfactory active reagent for use in a second ion exchange section of this invention. For example, this low pH effective reagent could be used to impregnate polymeric macroporous resins to produce the solid ion exchange agent for the second ion exchange section. Other ion exchange agents can be likewise prepared.

Additional solvent extraction reagents which are now available for the extraction of copper values from solutions of low pH can also be used to impregnate suitable macroporous solids to obtain low pH ion exchange agents. These include those previously mentioned as sold by Shell, Acorga, and Ashland.

Depending on the factors that may prevail for a particular industrial situation, one can, for the purpose of this invention, select suitable and effective and efficient ion exchange agents for use in the first and second ion exchange circuits. These factors would include, among others, copper concentration of the final feed solution, feed solution composition with respect to the ions present such as calcium, magnesium, sodium, aluminum, iron and silica, pH or acidity of solution, pH of the raffinate feed to the second ion exchange section, quantity of fine particulate matter in the feed, cost of reducing solution content of fines to acceptable levels, pregnant electrolyte requirements, spent electrolyte compositions, and leaching system or systems used.

For the first ion exchange section for most industrial situations ion exchange agents prepared by impregnation of suitable solids with Lix 64-N or Dow agent XF-4196 would be particularly effective and useful. Other agents may be preferred if certain circumstances vary. The above most preferred two are easily regenerated by the use of the spent electrolyte from the electrowinning section. Such spent electrolytes may contain 10 to 20 grams per liter of copper or more and from 150 to 200 grams per liter acid such as sulfuric acid.

For the second ion exchange we presently prefer an ion exchange agent prepared by impregnation of suitable macroporous solids with the proven low pH effective solvent extraction agent Lix 70. Others, of course, would also be suitable such as the Dow XF-4195 ion exchange agent. All of these are regenerable with strong acid solutions to yield eluates containing the recovered copper values and excess acid. These eluates can be used in the process of this invention as described herein.

It can also be seen by those skilled in this art that effective and desirable schemes are available in which combinations of solvent extraction and ion exchange are used. For example, the highly copper selective Lix 64-N reagent could be used in a first copper recovery section followed by the use of an ion exchange system in the second copper recovery section such as a LIX-70 impregnated agent. Alternatively, a suitable ion exchange system could be used for the first copper recovery step followed by the use of a LIX-70 solvent extraction system for the second copper recovery step. As mentioned before, LIX-70 is only one of the commercially available copper extraction agents which is particularly effective for very low pH solutions.

While certain embodiments and details have been shown for the purpose of illustrating this invention, it will be apparent to those skilled in this art that various changes and modifications may be made herein without departing from the spirit or the scope of the invention.

I claim:

1. A process for the recovery of copper values from copper-bearing ores comprising:

a. leaching the ore with mineral acid in the presence of water to produce a pregnant liquor stream containing dissolved metal values, and washing the leached ore residue with an internal recycle stream from step (c) in addition to other wash waters, b. passing additional water through the leach vessel containing spent ore residues, said ore being disposed from the system and said water being subsequently combined with the pregnant liquor stream from step (a) to form a resultant stream which is then passed through a c. first solid ion exchange section containing at least one stage having a solid ion exchange agent for adsorption of copper values, said ion exchange section producing a loaded solid ion exchange agent and an aqueous raffinate stream containing metal values not extracted from resultant stream of step (b) and separating said raffinate stream into a first internal stream of aqueous raffinate and a second internal stream of aqueous raffinate, d. passing the first internal raffinate recycle stream back to step (a) leach system, and e. passing the second internal stream to a second ion exchange section having at least one copper adsorption stage containing a second ion exchange agent where the metal values are adsorbed by the ion exchange agent at a low pH, said solid ion exchange stage producing a loaded solid ion exchange agent and a disposal stream, while;

f. the solid ion exchange agent from step (e) is eluted in at least one elution stage in the presence of sufficient eluting acid containing aqueous eluting agent, resulting in a regenerated ion exchange agent and eluate acid stream;

g. reusing the regenerated ion exchange agent from step (f) in the adsorption stage of step (e) while;

h. the eluate acid stream of step (f), containing recovered copper values is passed to the process described in step (a), while;

i. the loaded ion exchange agent produced in step (c) is subjected to at least one regeneration stage wherein a regenerated ion exchange agent and a pregnant electrolyte stream (eluate) is produced, subsequently;

j. reusing the regenerated ion exchange agent on the resultant stream for copper adsorption of step (c), while;

k. passing the eluate pregnant electrolyte to a metal recovery process from which exits a spent electrolyte which is recycled as eluting solution to step (i) as a stripping agent, while;

l. recovering the copper values as copper from step (k).

2. A process as described in claim 1 wherein the leach process is a vat leach process.

3. A process as described in claim 2 wherein the step (c) extraction agent is selected from the group consisting of alpha hydroxy oximes, benzophenone oximes, and alkyl hydroxyphenyl alkyl ketoximes on a macroporous polymeric matrix.

4. A process as described in claim 1 wherein the step (e) extraction agent is a chlorinated hydroxy benzophenone oxime on a macroporous polymeric matrix.

5. A process as described in claim 2 wherein the eluate of step (f) is passed through an acid mixing stage where sufficient fresh acid is added to yield a eluate solution containing the desired amount of acid for the process of step (a) before being passed to step (a).

6. A process as described in claim 1 wherein a mineral acid is added to the wash water of step (b) and the resulting solution utilized as a leaching agent in a dump leach, producing a second pregnant liquor stream.

7. A process as described in claim 6 wherein the pregnant liquor stream from the dump leach is combined with the pregnant liquor produced in step (a) prior to passage to step (c).

8. A process as described in claim 1 wherein the first internal stream of raffinate of step (c) is further divided to form a third and fourth recycle streams, said third recycle stream passing to step (a) and the fourth recycle stream being combined with acid to form a leaching agent for a dump leach, producing a pregnant leach liquor.

9. A process as described in claim 8 wherein the pregnant leach liquor from the dump leach is combined with the pregnant leach liquor of step (a) and the wash waters of step (b) to form the feed to step (c).

10. A process as described in claim 8 wherein the pregnant leach liquor from the dump leach is added to the leach system of step (a) to produce the pregnant leach liquor of step (a).

* * * * *

UNITED STATES PATENT OFFICE
CERTIFICATE OF CORRECTION

Patent No. 4,069,119      Dated January 17, 1978

Inventor(s) Soon Y. Wong

It is certified that error appears in the above-identified patent and that said Letters Patent are hereby corrected as shown below:

Drawing on the title page should be deleted and substituted with the attached Figure.

Column 1, line 21, "0.1" should be -- .01 --.

Column 7, line 67, "would" should be -- could --.

Column 10, line 14, "cold" should be -- could --.

Column 14, line 52, after and, the word -- an -- should be inserted.

Signed and Sealed this

Ninth Day of May 1978

[SEAL]

Attest:

RUTH C. MASON
Attesting Officer

LUTRELLE F. PARKER
Acting Commissioner of Patents and Trademarks